Oct. 28, 1947.  G. D. ALLMAN  2,429,909
DEFROSTING METHOD
Filed Nov. 25, 1942
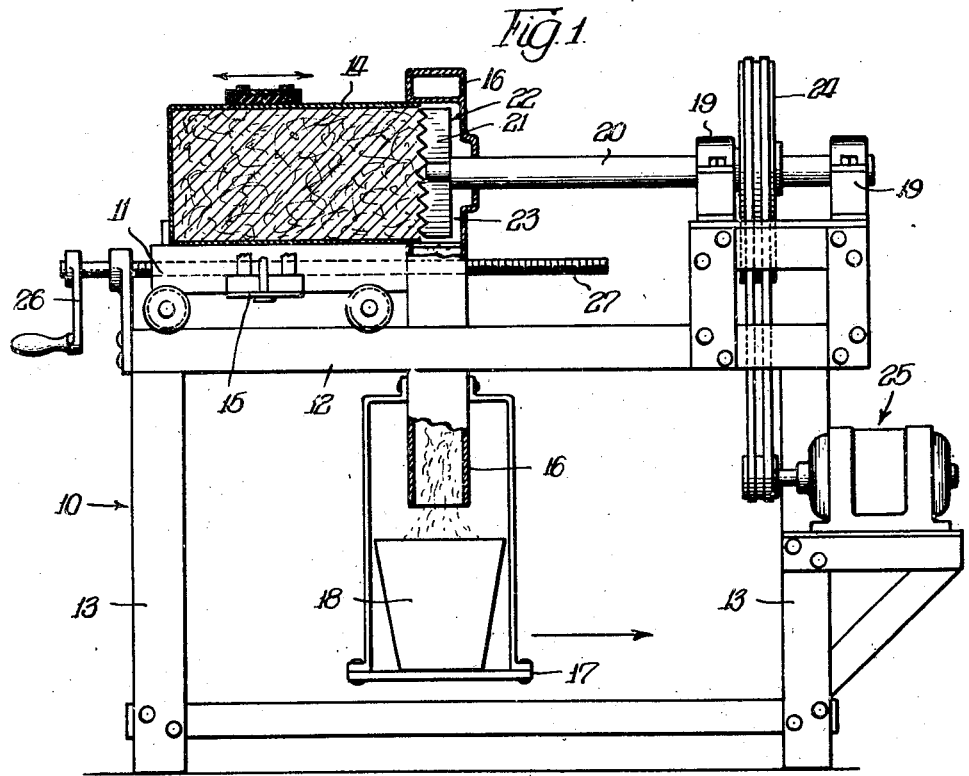
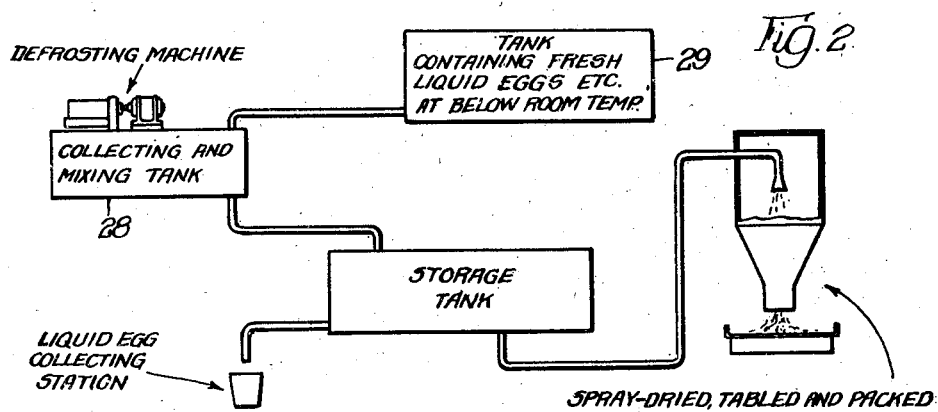
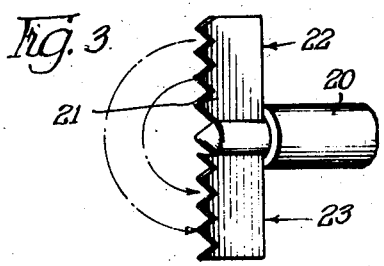
INVENTOR.
George Dudley Allman,
BY
Cromwell, Greist & Warden
attys Patented Oct. 28, 1947

2,429,909

UNITED STATES PATENT OFFICE 2,429,909

DEFROSTING METHOD

George Dudley Allman, Chicago, Ill., assignor to United States Cold Storage Corporation, Wilmington, Del., a corporation of Delaware Application November 25, 1942, Serial No. 466,965

3 Claims. (Cl. 99—196)

The present invention relates to defrosting of frozen products. More particularly, it pertains to an improved method and machine for rapidly defrosting eggs which have been frozen into a solid state from their liquid condition while in containers by speedily comminuting and removing the contents from the containers in the form of an egg snow for immediate subsequent defrosting treatment to convert the snow or resulting crystalline mass into substantially its original liquid condition.

A problem which has long confronted the industry has been the elimination of bacterial contamination, particularly during the process of defrosting solidly frozen liquid eggs, because of the complete lack of a method for almost immediately removing the solidly frozen product from the cans. The extent of bacterial contamination in frozen eggs and the amount of fermentation permitted prior to use are important factors in the further development of a satisfactory market. A large percentage of the bacteria in frozen whole eggs, frozen yolks, and frozen whites are present as a result of manipulations in packing and freezing. Extensive improvements in recent years in general have materially improved the quality of frozen eggs, and it is of vital interest to the egg packer that his product shall not deteriorate prior to use. However, a solution to the problem of elimination of bacterial contamination subsequent to the freezing of the eggs while in the containers, that is, the defrosting thereof to put the eggs in the most desirable condition for ultimate use was not, as far as I am aware, arrived at until the discovery of the present method and means for carrying the same into effect. Heretofore numerous attempts have been made to solve this problem. For example, hot air was forced over the cans of frozen egg products in an effort to thaw the frozen product from the cans. This consumed at least about 8 hours. A conventional practice for a long time has been merely to allow the containers to stand at room temperature, the defrosting period continuing for about 24 hours. Another method for removing the product consisting of holding the cans of eggs in cold running water at about 11.5° C., the period of defrosting time consuming also about 24 to 25 hours before the egg meats were completely defrosted. A more recent method for getting the product out of the cans suggested rapid transmission of heat into the frozen egg material. For example, a machine was built in which a can of eggs immersed in cold water was given a short rotating motion, a rotating bracket holding the can being fitted into a wooden tub for this purpose. The rotating motion was obtained from an eccentric shaft driven by an electric motor. During the period of rotation a continuous stream of cold water from a large defrosting tank was maintained through the wooden tub.

Subsequent analysis and investigation involving all of these various attempts to secure rapid defrosting demonstrated that, in each case, at least three areas of different degrees of bacterial contamination were formed which served to encourage further bacterial growth. Samples taken in each case showed that these areas consisted of the outside edge of the frozen egg material, the material in the middle of the can, and that portion between the outside edge and the middle of the can. In any event, the periods of defrosting were of such length that not only were the amounts of bacteria initially contained in the product given an opportunity considerably to be multiplied but also the length of time in each instance provided opportunity for access of additional amounts of bacteria from operational conditions and environment.

A general object of the invention, therefore, is the provision of a method and means whereby such disadvantages and difficulties as those above mentioned will be overcome, to the end that the ultimate product obtained will have a bacteria count which will be reduced to a minimum.

A principal object of the invention is the provision of a method and means for defrosting frozen eggs to eliminate harmful bacterial contamination and growth by substantially instantaneous conversion of the physical form of the container contents to a form of product which will readily lend itself to almost immediate removal from the containers and subsequent defrosting thereof by a method of treatment which will restore the same to substantially its original liquid condition.

More specifically, the invention has for an object the provision of a method and means for defrosting eggs which have been frozen into a solid state from their liquid condition while in cans by first comminuting the solid mass to a crystalline form of product rapidly to remove it from the cans and thereafter so treating it so as to convert the crystalline mass into substantially the original liquid condition of the eggs.

Another object of the present invention is to convert the solid mass of eggs in the container to an egg snow and thereafter defrost the snow by the continuous subsequent addition of freshly cracked eggs, water, or both, below room temperatures.

A further object of the invention is to provide a method and means for rapidly defrosting frozen eggs in containers by comminuting the frozen product in such a manner as to convert it into an egg snow whereby it is readily removed from the container and simultaneously therewith is substantially completely homogenized to a point whereby the same is suitable for subsequent use.

A still further object is the provision of a method and means for practicing the invention wherein a minimum of equipment is utilized and only a fraction of operating space, as compared with that heretofore used, is essential.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawing, in which:

Fig. 1 is a side elevational view illustrating one suitable form of an egg defrosting machine, partly in section and with parts broken away, designed for use in connection with the herein described process;

Fig. 2 is a diagrammatic representation of a process illustrating the use of a machine similar to that depicted in Fig. 1 in connection with said process showing the recovery of defrosted liquid eggs as well as a further step in the process permitting the recovery thereof in dehydrated form; and Fig. 3 is a perspective view of a preferred form of comminuting tool for converting the frozen eggs into crystalline form and simultaneously homogenizing and removing the same from their containers.

As heretofore indicated, it is desirable during certain seasons to store eggs and one convenient form of doing this is by subjecting the eggs to a cracking process, recovering the liquid contents, either in the form of whole, yolk or whites, and thereafter transferring them to suitable containers. These containers, preferably metal cylindrical cans, hold on an average of 30 pounds of the liquid product and for storage purposes these are sealed and subjected to temperatures far below freezing points, usually transforming their contents into a solid state. The packer or storer of such eggs keeps the same on hand until calls by other users release them from storage. On the other hand, the packer may find it desirable to transform these frozen eggs into either a liquid form or perhaps into a dehydrated form, such as the powdered type, subsequently to be packaged for use by the ultimate consumer. The chief obstacle has been the difficulty of quickly emptying the eggs from the cans. The present method and means of comminuting and thereby substantially immediately removing the frozen egg product from the cans by changing its form from the solid state to a crystalline mass or so-called "egg snow" has resulted in a practical solution of the problem.

Referring more particularly to Fig. 1 of the drawing, there is illustrated generally at 10 a suitable form of machine designed for ready and rapid removal and transformation of the product from containers. The machine consists of a carriage 11 mounted on a bed constituting tracks 12 located on suitable standards 13, 13. The carriage is constructed to receive a can 14 of frozen eggs in horizontal position after the cover has been removed.

A suitable locking device indicated in part at 15 is secured to the carriage and is adapted to fit around the body of the can temporarily to hold it in fixed and secured position. Preferably, the under side of the locking device encircling the body of the can is provided with a composition cushion or gripping pad which will prevent the can from turning or slipping from its position.

Associated with the forward end of the carriage is a hopper 16 having an opening therein facing the can and through which the open end of the can is inserted. This hopper surrounds the mouth of the can and projects downwardly below the tracks of the machine. In its illustrated form the hopper has connected to it a platform or cradle 17 carrying a collecting trough or container 18 which is disposed immediately beneath the mouth of the hopper 16. This arrangement illustrates the particular machine in its simplest form. The cradle can be dispensed with when operating the machine under greatly increased production demands and in connection with certain steps in the method as more fully explained hereinafter.

At the other end of the machine and mounted over the tracks 12 is a platform supporting two standards having bearings 19, 19. Within these bearings is journaled a shaft 20. At one end of the shaft, which also penetrates an opposite opening of the hopper which is also encased by the hopper 16, is a cutting tool 21. This cutting tool is more specifically illustrated in Fig. 3. The tool consists of at least two rows of teeth indicated generally at 22 and 23 which are radially disposed opposite each other from the horizontal axis of the cutter or shaft 20 carrying the same. It will be observed that the teeth in one row, for example, those illustrated at 22, are so disposed from the center of the tool that the paths of rotation of each tooth will follow between the paths of rotation of the adjacent teeth in row 23. While additional rows of teeth so disposed may be utilized, I have found that at least two are required with the type of machine illustrated.

The cutter 21 is driven at a rapid rate of speed, the shaft 20 having affixed thereto an oversize sheave pulley 24 mounted on the shaft between the bearings 19, 19. The pulley is driven by any suitable source of power such as, for example, a motor indicated generally at 25 located in any suitable position. At the other end of the machine, and controlling the horizontal movement of the carriage, a manually operated crank 26 is used to turn a screw 27 threaded through the yoke of the carriage. The manually controlled operation of the carriage is adequate for small scale operations but it is within the contemplation of the invention to utilize an automatically controlled arrangement associated directly with the motor drive or a source of power independent thereof for large scale operations.

In actual operation, a can of frozen egg product with the cover removed is placed in locked position upon the carriage. After the cutting blade is put in rapid rotation the solid contents in the can are urged against the rotating cutter until the latter penetrates the interior of the can, adjacent its walls and bottom. At the high speed at which the cutter is revolving the solid egg product is progressively converted into a crystalline mass or egg snow, the cutter rapidly reaming the frozen contents of the can and simultaneously expelling the same from the mouth thereof. Actually such an operation consumes but a matter of seconds and as the egg snow leaves the mouth of the can it is directed by the hopper into the trough on the cradle below. It will be understood, of course, that the operation of the device should be carried out in a room under suitable aseptic conditions, particularly of temperature, so as to eliminate as much as possible harmful bacterial multiplication as well as contamination from operational sources. The trough or bucket of snow should immediately be emptied into a storage tank and the crystals subjected to further treatment rapidly to defrost the same and restore them to their original liquid condition.

Under conditions of increased production, a process as diagrammatically represented by Fig. 2 is contemplated as the most desirable. Referring to that diagram, it will be seen that the defrosting machine is mounted upon a collecting tank 28. This tank is designed to accommodate such a defrosting machine without the bed and tracks 12 and the standards 13. The machine is suitably supported by the cover of the tank which preferably is sealed and operated under conditions which eliminates the hazard of bacterial contamination. Also, the cradle associated with the hopper will also be omitted. Under such circumstances, the device may best be operated in reverse of that above described in connection with the simpler form of machine. For example, this contemplates that the carriage 11 be in fixed position, in which case manual advance thereof and certain associated parts, such as the lower portion of the hopper, the cradle and trough as above mentioned will be unnecessary. However, the rotating tool instead of being mounted in a position where it remains fixed should be arranged to penetrate the can by having the entire assembly, for example, proceeding along the track on which it is mounted and thereafter similarly being withdrawn from the can after the necessary reaming and snow expelling functions have been performed. In this manner, the egg snow being expelled from the mouth of the container is caught by the stationary hopper and directed into the collecting tank 28. The many advantages of such an arrangement will better be appreciated when it is desired to use the same in connection with the process about to be described.

After a number of cans in rapid succession have been emptied of their contents, into the collecting tank, in the crystalline form of egg snow, the snow will be treated to bring about further and complete defrosting thereby to change it into substantially the original liquid state of the eggs.

Further defrosting may be carried on by following one of two alternate preferred procedures. Freshly cracked eggs contained in a supplemental feed tank 29 communicating with the collecting tank 28 are continuously fed into the latter. The temperature of the freshly cracked liquids should be below room temperature although the collecting tank and defrosting machine themselves are being operated in an isolated chamber which also is below freezing temperature. As the freshly cracked stream of eggs is fed into the collecting tank, the same may be mixed by any suitable form of agitating device, to aid more rapidly in defrosting the crystalline mass.

During those seasons when fresh eggs are not sufficiently available the alternate procedure which can be followed is the constant and continuous feeding into the collecting tank of a stream of water to be commingled with the egg snow, also to the end that the same can more readily be defrosted. As a further alternative, a mixture of both water and freshly cracked liquid eggs can be passed into the collecting tank in proportions depending upon the availability of eggs at the particular time the system is in operation.

Following this mixing step, it may be desirable to run the mixture through an homogenizer. This is only desirable if the resulting mixed mass is in a so-called rubbery condition and it is desirable to speed the conclusion of the defrosting and secure somewhat greater homogeneity. However, I have found that the means and method whereby I change the frozen eggs from the solid state to the crystalline form or egg snow have so homogenized the same that additional homogenization may, when desired, be omitted entirely.

After the mass has been suitably defrosted it is then run into a storage tank where the original containers may be filled with the product substantially in the same liquid condition (except for its homogeneity) it was in when the cans were originally filled and frozen. Where water has been used as an aid in defrosting it may be desirable to dehydrate the same by passing the liquid through some suitable form of evaporator, and, when desired, the same may thereafter be run into a spray drying apparatus where the product is substantially completely dehydrated, changed to powdered form, tabled and packed for shipment.

Instead of consuming periods of time anywhere from 8 to 24 or 25 hours in order to bring about the defrosting of the frozen product, my invention produces the same results more advantageously in a matter of minutes and under conditions which will substantially eliminate the danger of bacterial contamination.

It will thus be seen that the objects hereinbefore set forth may readily and efficiently be attained and since certain changes in carrying out the above method and in the constructions set forth, which embody the invention may be made without departing from its scope, it is intended that all matter contained in the above description or shown in the accompanying drawing shall be interpreted as illustrative and not in a limiting sense.

Having described my invention, what I claim as new and desire to secure by Letters Patent, is:

1. In a method of defrosting liquid food products which have been placed into a container and frozen therein into a solid condition, the improvement which comprises rapidly comminuting the exposed frozen contents to change the same into the form of a crystalline mass of snow of increased bulk and increased exposed surface area throughout said entire mass, thereby quickly to expel said snow from the mouth of the container to prepare the same for rapid thawing, and thawing said snow to transform it to a liquid condition.

2. A method of defrosting egg liquids which have been placed into a container and frozen therein into a solid condition, which comprises rapidly comminuting the solidly frozen egg contents to change the same into the form of an egg snow of increased bulk and increased exposed surface area, thereby quickly to expel said snow from the mouth of the container and to prepare the same for rapid thawing, and mixing with said snow other egg liquids of a temperature sufficient to thaw said snow.

3. A method of defrosting egg liquids which have been placed into a container and frozen therein into a solid condition, which comprises rapidly comminuting the solidly frozen egg contents to change the same into the form of an egg snow of increased bulk and increased exposed surface area, thereby quickly to expel said snow from the mouth of the container and to prepare the same for rapid thawing, mixing with said snow an amount of water of a temperature sufficient to melt said snow, and dehydrating said melted snow to remove substantially all of the water added to melt the same.

GEORGE DUDLEY ALLMAN.

REFERENCES CITED

The following references are of record in the file of this patent:

UNITED STATES PATENTS

| Number | Name | Date |
|---|---|---|
| 237,150 | Williams | Feb. 1, 1881 |
| 223,743 | Macy | Jan. 20, 1880 |
| 1,145,927 | Shorten | July 13, 1915 |
| 2,133,319 | Davis | Oct. 18, 1938 |
| 2,130,237 | Hormel | Sept. 13, 1938 |
| 1,441,305 | Smallwood | Jan. 9, 1923 |